United States Patent
Green et al.

(10) Patent No.: US 7,191,038 B2
(45) Date of Patent: Mar. 13, 2007

(54) ELECTRONICALLY CONTROLLED VEHICLE LIFT AND VEHICLE SERVICE SYSTEM

(75) Inventors: Steven D. Green, Madison, IN (US);
Lawrence Chase, Vevay, IN (US);
Larry D. O'Cull, Westfield, IN (US);
Michael R. O'Cull, Cicero, IN (US)

(73) Assignee: Rotary Lift, a division of Dover Industries, Madison, IN (US)

( * ) Notice: Subject to any disclaimer, the term of this patent is extended or adjusted under 35 U.S.C. 154(b) by 0 days.

(21) Appl. No.: 10/891,467

(22) Filed: Jul. 14, 2004

(65) Prior Publication Data

US 2005/0182522 A1 Aug. 18, 2005

Related U.S. Application Data

(63) Continuation-in-part of application No. 10/055,800, filed on Oct. 26, 2001.

(60) Provisional application No. 60/243,827, filed on Oct. 27, 2000.

(51) Int. Cl.
*G05B 15/00* (2006.01)

(52) U.S. Cl. .............. 700/275; 254/45; 254/93 L
(58) Field of Classification Search ........... 700/275; 254/45, 93 L
See application file for complete search history.

(56) References Cited

U.S. PATENT DOCUMENTS

| | | | | |
|---|---|---|---|---|
| 5,299,904 A | * | 4/1994 | Simon et al. | 414/541 |
| 5,341,575 A | * | 8/1994 | Chisum | 33/288 |
| 5,675,515 A | * | 10/1997 | January | 700/279 |
| 5,829,948 A | * | 11/1998 | Becklund | 414/607 |
| 6,286,629 B1 | * | 9/2001 | Saunders | 187/394 |

* cited by examiner

*Primary Examiner*—Albert W. Paladini
(74) *Attorney, Agent, or Firm*—Frost Brown Todd LLC

(57) ABSTRACT

A vehicle lift has a communication and/or a lift control assembly, including a processor, which is functional to control the raising and lowering of the lift and to enable the display of, and communication of, a variety of lift data. The vehicle lift includes sensors in communication with the control, where the pre-programmed processor recognizes and categorizes lift data and lift faults before sending warnings, notices, and other lift data to lift users, maintenance providers, or a central headquarters. The visual display unit of the assemblies may include a processor and may be detachable or adjustable.

20 Claims, 13 Drawing Sheets

ELECTRONICALLY CONTROLLED VEHICLE LIFT AND VEHICLE SERVICE SYSTEM

This application is a continuation in part of U.S. patent application Ser. No. 10/055,800, filed Oct. 26, 2001, titled Electronically Controlled Vehicle Lift And Vehicle Service System, the disclosure of which is incorporated herein by reference, and incorporates by reference the disclosure of U.S. Provisional Application Ser. No. 60/243,827, filed Oct. 27, 2000.

FIELD OF THE INVENTION

The present invention relates, in general, to vehicle lifts and their controls and, more particularly, to vehicle lifts having a communication, and/or monitoring control, system and display.

BACKGROUND OF THE INVENTION

Hydraulic and electro-mechanical (e.g. screw) vehicle lifts for raising and lowering vehicles are well known. While the design and configuration of vehicle lifts vary, they all are used primarily for servicing vehicles. They must all have some type of control system to effect the raising and lowering function.

Prior art control systems for hydraulic lifts typically include an electric switch wired in series with the pump motor for raising the lift and a manually operated lowering valve for lowering the lift. Raising and lowering a vehicle into position typically requires a series of steps.

Raising a vehicle with such a hydraulic lift requires depressing the electric switch to raise the vehicle, followed by operating the lowering valve to lower the lift to the locking mechanism. To lower a vehicle beyond the locking mechanism, such as to the ground, the first step is disengagement of the latches, which may be manually, electrically or pneumatically disengaged. The technician must first raise the lift off of the latches, and then either manually disengage the latches, or operate an electric switch or a pneumatic valve through a lever. The technician next operates the lowering valve while continuously operating the electric switch or pneumatic valve to hold the latches disengaged.

The vehicle lift and the area close by the lift, within which the technician moves and works on the vehicle, is generally called the lift bay or service bay. To use the vehicle lift properly and safely, the technician needs accurate information regarding the safe operation and maintenance of the lift, such as for example vehicle lift points, operating conditions of the lift, maintenance and trouble shooting information. While working on a vehicle, a technician may need immediate access to current and accurate information regarding operating the lift and servicing the vehicle.

Typically, the information needed by a technician is not available at the lift bay. While the needed information is generally available as manuals or other printed form, such are frequently not kept in the service bay, if kept anywhere at all, and may be outdated. To obtain the information, the technician is thus usually required to leave the bay and locate the information. A technician may be unwilling to leave the bay to locate the information, since this adds another step to the technician's work schedule. A technician may work more efficiently if everything needed to work on the vehicle is within the bay. Time spent by a technician away from the bay to obtain information, parts, process paper work, etc. detracts from the efficient performance of service on the vehicle.

Instruction on proper lift use is important for new technicians or new lifts. In such training situations, instruction may not occur at all if much effort is required to learn or teach the use of the lift or to locate the relevant instructional material. Instruction may be given by other technicians who may themselves not be aware of the proper operation of the lift, relying instead on their own understanding of operating the lift.

Proper lift maintenance is also important. Routine maintenance may need to be performed to keep a lift operating properly and safely. Although the need for preventative maintenance arises from the usage of the lift, information on preventative maintenance of lifts is not always readily available. Routine maintenance schedules may be kept independent of the lifts, such that the technician does not typically know while he is in the lift bay whether routine maintenance needs to be performed. Maintenance information regarding repair or trouble shooting information is also typically not kept in the lift bay, which may result in limited or inefficient use of such important resource materials.

Although vehicle lifts define the service bay and are the focal point for servicing a vehicle, vehicle lifts themselves are considered secondary to other equipment used to service a vehicle. The view of the capabilities of a vehicle lift and its control has been limited to the raising and lowering functions, and has not extended to other functions. Thus, vehicle lifts and their controls have not been considered by those skilled in the art for providing access to information needed by the technician, or for collecting and transmitting information relative to operation of the lift of the servicing of the vehicle.

In many existing devices, electronic controls for basic lift control functionality are contained within a cart-like apparatus positioned adjacent to the lift. In a crowded workstation, this cart-like apparatus may take valuable space that may be at a premium in the workplace. It would therefore be advantageous to provide an electronic control or communication device that reduces general clutter in the workplace while providing easy access to control or communication functionality.

The present inventors have recognized that the overlooked vehicle lift and its control can meet the unrecognized needs for electronic delivery of information to and from the lift bay. The advent by the present invention of providing the ability to access, collect and transmit information by the vehicle lift control in addition to providing the lift functions, creates the new need to be able to revise the new non-lift functions of a lift control completely independent of the lift functions of the lift control.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
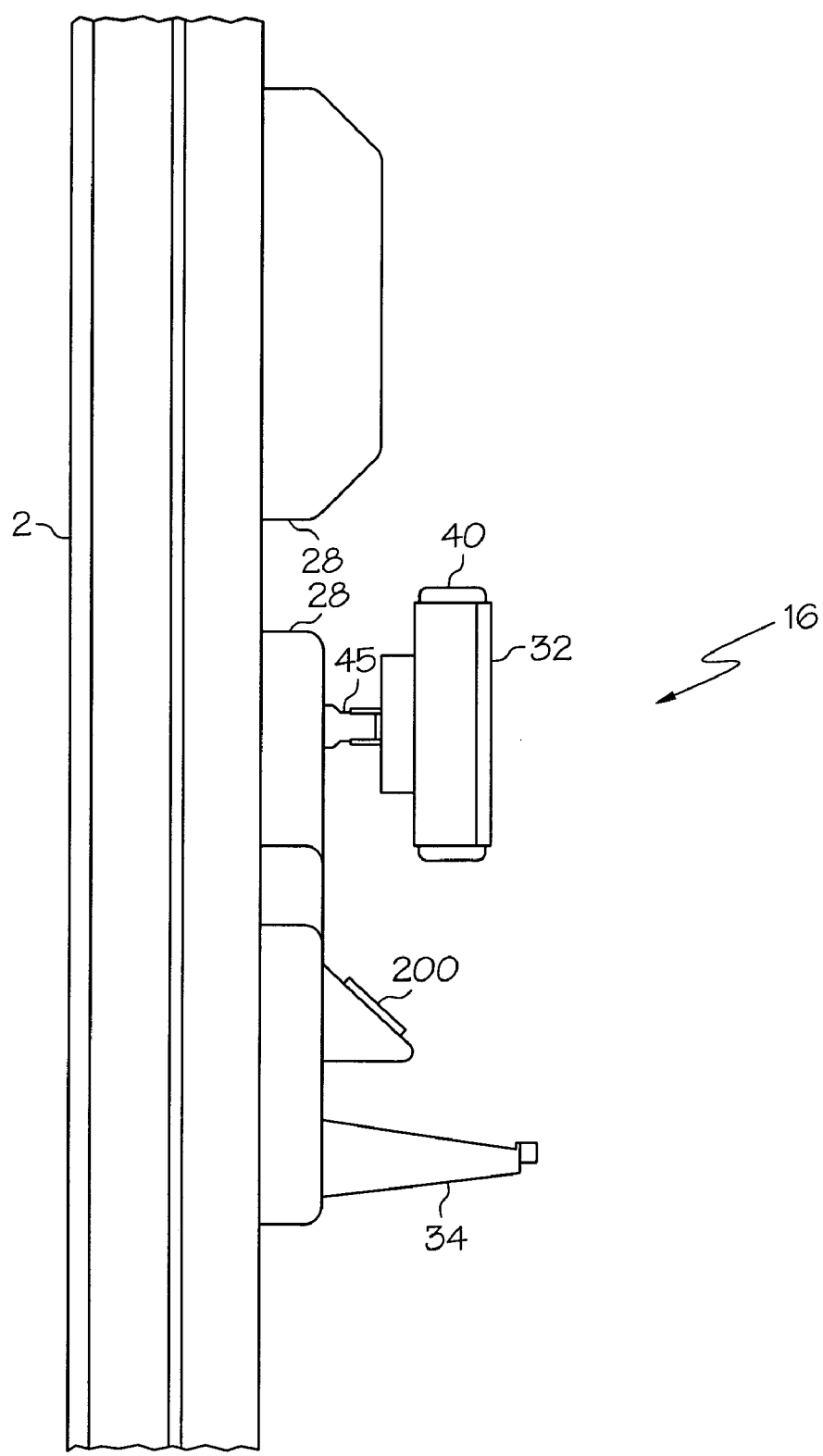
FIG. 1 is a partial side view of a column of a vehicle lift with control and display in accordance with the present invention.

Referring now to the drawings in detail, wherein like numerals indicate the same elements throughout the views, FIG. 1 illustrates a side view of one embodiment of a control assembly 16 in accordance with the present invention. Control assembly 16 may include a control portion and/or a display portion. One embodiment of the present invention comprises detachably or permanently coupling a computer such as, for example, a laptop or tablet computer, to a lift such as to lift column 2 in order to reduce general workplace clutter. Control assembly 16 may include, for example, bracket 34 for retaining a data input device adapted for entering lift data such as, for example, a keyboard, a mouse. Alternatively, the data input device may be, for example, a touch screen integrated with display unit 32. Lift data is herein defined as any data relevant to the safety, maintenance, operation or control of a lift. The input device may be coupled with a processor (not shown) housed within display unit 32 or enclosure 28. The input device may, for example, be a touch screen, a keyboard, a mouse, or any other suitable input device. The processor may, for example, be adapted to provide lift data to a user via a visual display, to provide lift data to a remote or central location, such as a corporate headquarters, or to provide lift data to a user, where the data is received over a network from a remote location. As used herein the term "remote location" shall be read to include any display, lift, evaluation location, maintenance location, security location, data processing center and/or any other location not contained at the lift. In a further embodiment of the present invention, the processor of control assembly 16 may be integrated with the lift such as at column 2 to control, for example, the movement, access, maintenance, or security of the lift.

In one embodiment of the present invention, control assembly 16 includes a processor that controls the movement of the lift. The same processor, or one or more additional processors may also control, for example, access, and/or security, in addition to the communication features of control assembly 16 such as, for example, receiving lift data over a network, updating lift data, such as manual information, from a remote location, sending lift data from the lift to a remote location, such as a corporate headquarters, or sending lift data to other lift assemblies connected via a network.

In one embodiment of the present invention, control assembly 16 may comprise display unit 32, which may be a computer (including a processor), and a lift control interface 200. Display unit 32 may, for example, receive and display sensor data, lift data from a remote location, advertisements and/or warnings from the processor. In one embodiment of the present invention, when display unit 32 is engaged with locking structure 40 of control assembly 16, data display and communication to and/or from the processor may be continuous or delivered at preprogrammed intervals. In one embodiment, when display unit 32 is disengaged from locking structure 40, lift data communication to display unit 32 may be halted, where display unit 32 may continue to display data received and stored prior to the disengagement. Data may be stored in display unit 32 on a hard drive, as RAM, or in any other suitable storage medium. In one embodiment, when re-engaged with locking structure 40, communication with display unit 32 may be reestablished. When display unit is disengaged, by way of example, a processor in locking structure 40 may continue to store in-coming data on a hard drive, as RAM, or in any other suitable storage medium. Reconnecting display unit 32 to locking structure 40 may cause the processor of locking structure 40 to transmit any or all lift data that was stored while display unit 32 was detached.

In one embodiment of the present invention, the movement of the lift may be controlled by or through a processor which is part of the display unit 32. If the display unit 32 is removable, it is desirable that the movement of the lift still be controllable. In such a case, lift movement control would be effected by a processor which remains attached to the lift, controlled such as by lift control interface 200. Lift control interface may 200 be any suitable input device such as, for example, a touch screen or a keyboard. It is to be noted that effecting control of lift movement through a processor permanently attached to the lift, rather than at some times through a removable processor, such as one combined with the display unit 32 (when configured as a table or laptop computer), simplifies the system, avoiding any issues with control transfer between the permanent processor and the display unit processor.

The user may control the lift via lift control interface 200, where control data may be communicated to the processor which communicates with the lift features of the vehicle lift. In addition to controlling the lift movement, the processor may also communicate lift control data to, for example, display unit 32, a remote location, adjacent lifts, and/or a service provider. In one embodiment of the present invention, when display unit 32 is detached from locking structure 40, lift control interface 200 retains its functionality although lift control data may not be transmitted to display unit 32 until display unit 32 is reengaged with locking structure 40.

Figure 2:
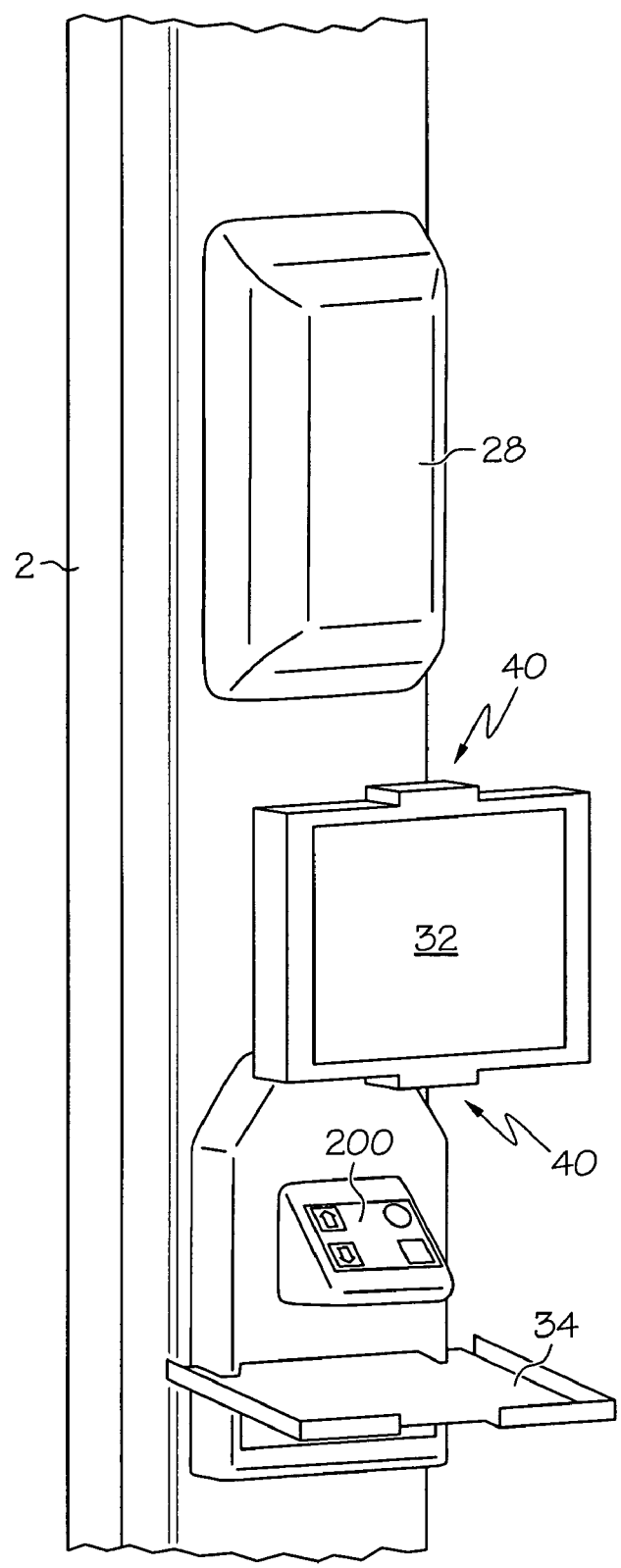
FIG. 2 is a partial perspective view of the vehicle lift column of FIG. 1.
Figure 2A:
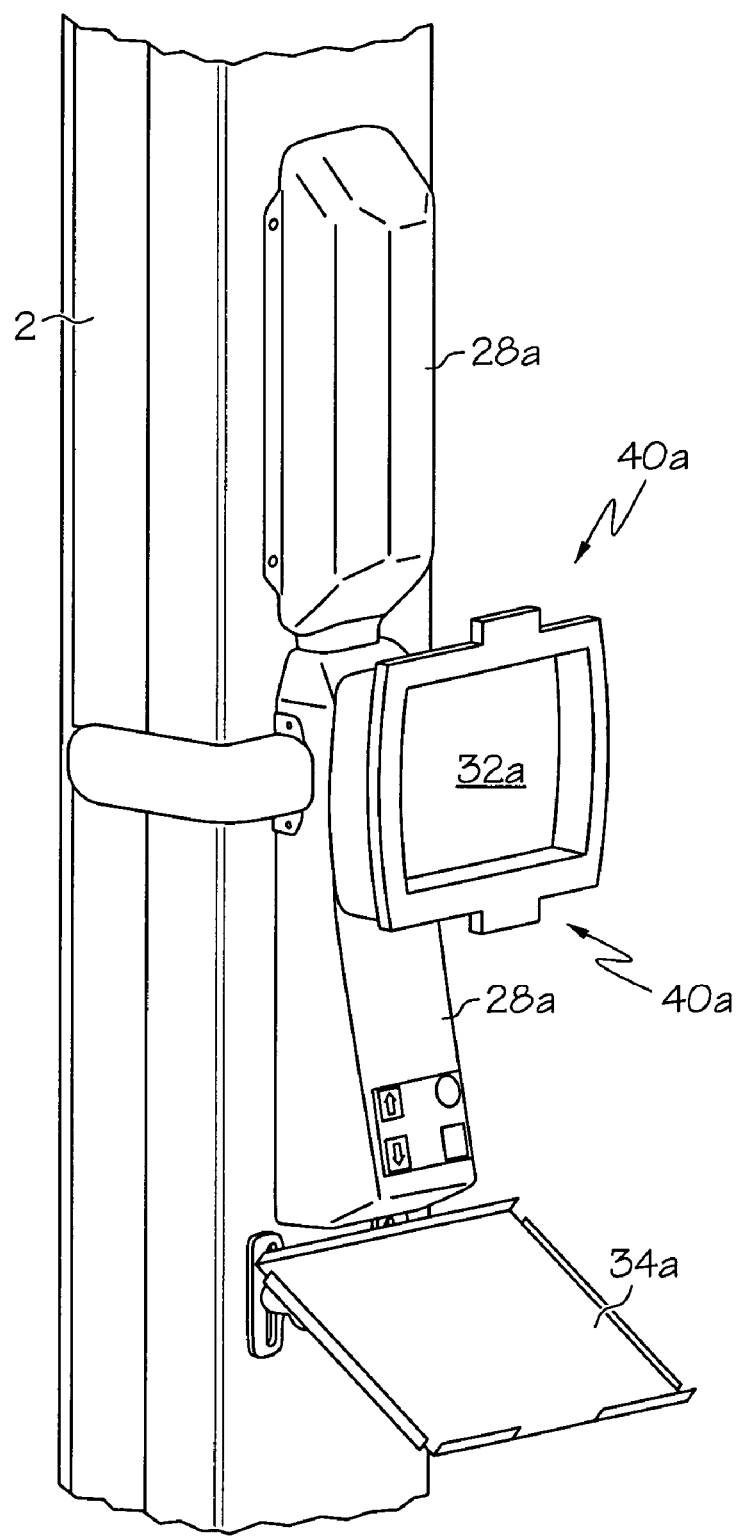
FIG. 2a is a partial perspective view of another embodiment similar to FIG. 2.

As mentioned above, in one embodiment of the present invention, a processor of control assembly 16 may be contained within display unit 32, where display unit 32 may be, for example, a currently available laptop computer or interactive tablet such as FUJITSU model ST5010. Display unit 32, in one embodiment of the present invention, may be docked within docking structure 40 (see FIG. 2), such that display unit 32 may be locked into place while the lift is in use, or removed, for use as a wireless display, or as a stand alone computer. (It is noted that if the display unit 32 provides the only processor which controls lift movement, movement of the lift is not effected when the display unit 32 is not docked.)

Figure 8:
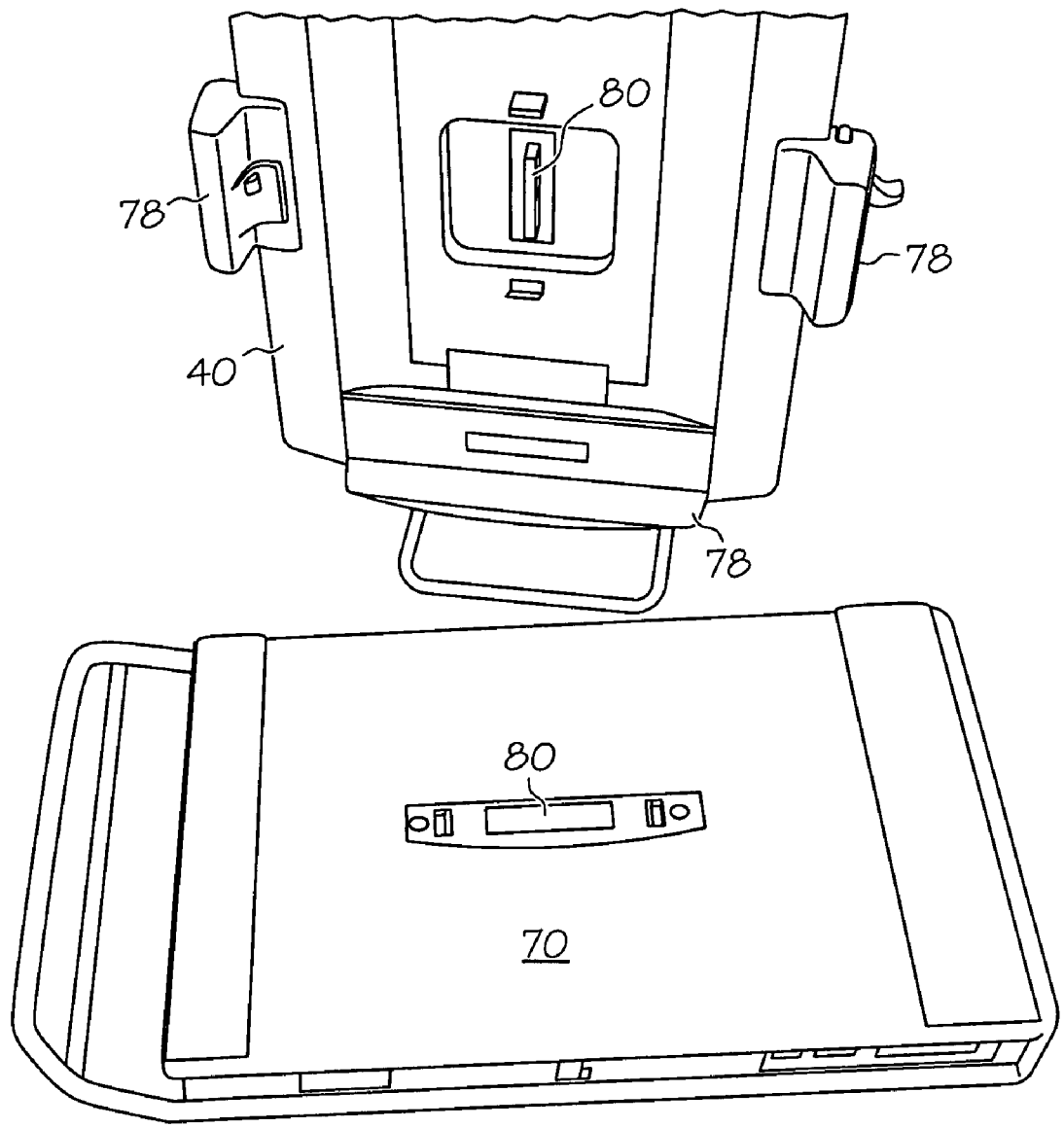
FIG. 8 is a perspective view of a disconnected display unit and docking structure.

In one embodiment of the present invention, display unit 32 may be provided with wireless network communication to, for example, the internet, via, for example, blue tooth, or other suitable wireless connections. In a further embodiment of the present invention, display unit 32 may have its own power source, such as a rechargeable battery, which allows it to operate when not disposed in docking structure 40. Coupling 80 (FIG. 8) may be included to provide display 32 with power and/or data communication port or coupling. In a further embodiment of the present invention, display unit 32 may be provided with an AC plug, such that the plug may be inserted into a standard AC outlet housed within control assembly 16, the lift, or a standard wall outlet. Alternatively, a display may be permanently affixed to the lift. Still other configurations for providing display features will be apparent to those of ordinary skill in the art.

In one embodiment of the present invention, input device 34 may be in communication with display unit 32 via a wireless connection or a standard wired connection. In a further embodiment of the present invention, input device 34 may be integrated with display unit 32 such as, for example, in a laptop or table configuration, or as a touch screen display. Any information related to the operation of the lift, including, without limitation, lift data, usage data, operation fault data, and/or vehicle data, may be received by and/or stored, for example, in a memory within enclosure 28, in a memory of display unit 32, and/or at a remote location, such as a corporate headquarters, or elsewhere in the facility in which the lift is situated. The present invention comprises storing data by any suitable means such as, for example, in a hard drive or RAM provided within enclosure 28 or display unit 32. Alternatively, data may be stored in any removable medium and/or in any suitable remote and/or local location Referring to FIG. 1, one embodiment of the present invention comprises providing control assembly 16 with coupling 45 for attaching display unit 32 or docking structure 40 to the lift, such as to enclosure 28 or directly to column 2. One embodiment of coupling 45 is disclosed in more detail in FIG. 3. Coupling 45 may be, for example, a rigid mount, a telescoping mount, or a swivel mount. Adjustable mounts may provide users with a more convenient means of viewing and/or inputting information into display unit 32.

Figure 3:
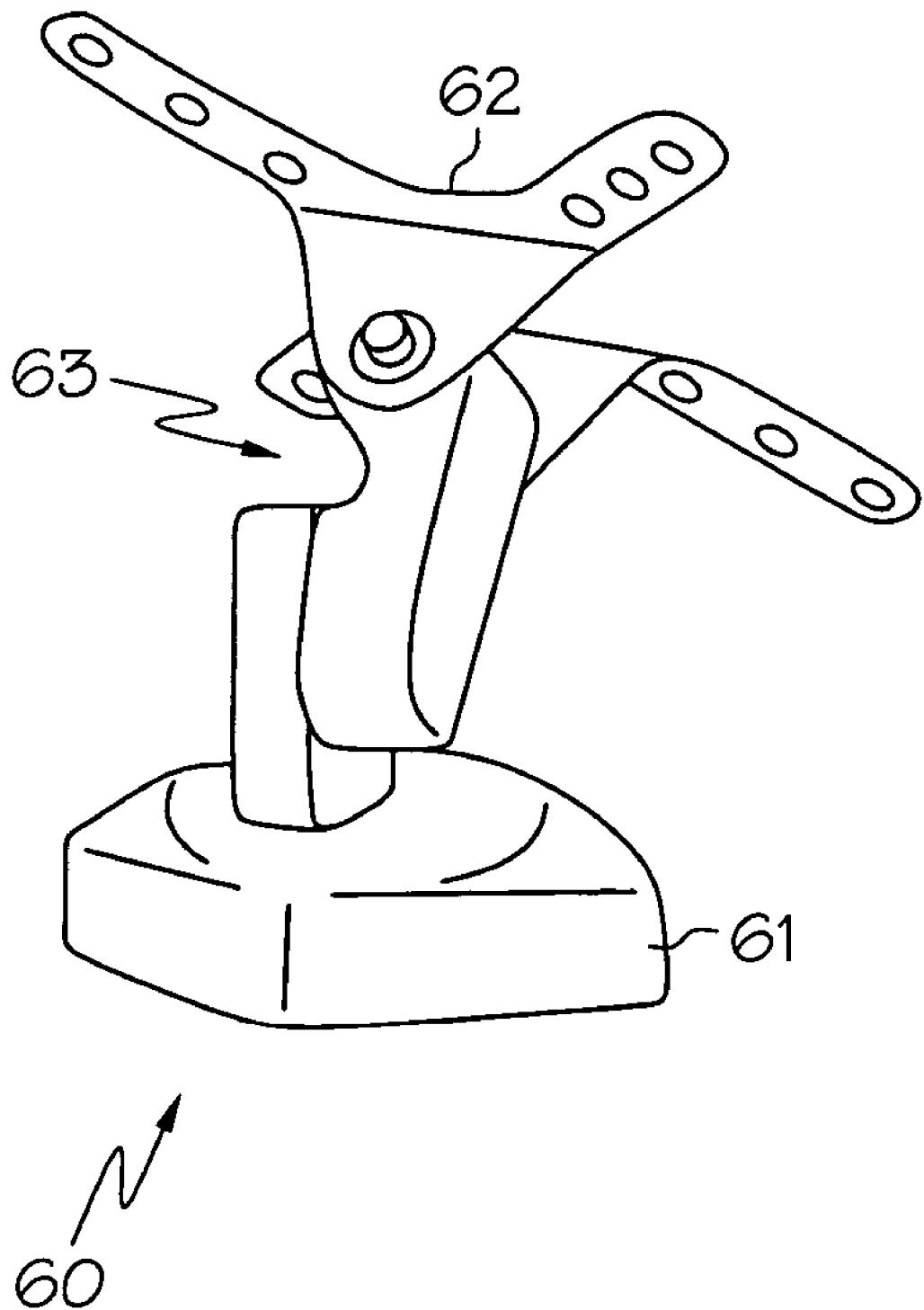
FIG. 3 is a perspective view of a coupling for a vehicle lift control and display in accordance with the present invention.

FIG. 3 illustrates one embodiment of swivel coupling 60, having joint 63, where first mount 61 may be coupled to docking structure 40 or display unit 32, and second mount 62 may be mounted to enclosure 28 or directly to column 2. The swivel coupling 60 may allow for the display unit 32 to be adjusted to a suitable level and/or angle to permit high visibility and/or accessibility to users. It will be apparent to those of ordinary skill in the art that a plurality of adjustable and/or movable couplings are in accordance with the present invention. Alternatively, docking structure 40 may be rigidly or otherwise non-movably coupled to enclosure 28.

Figure 4:
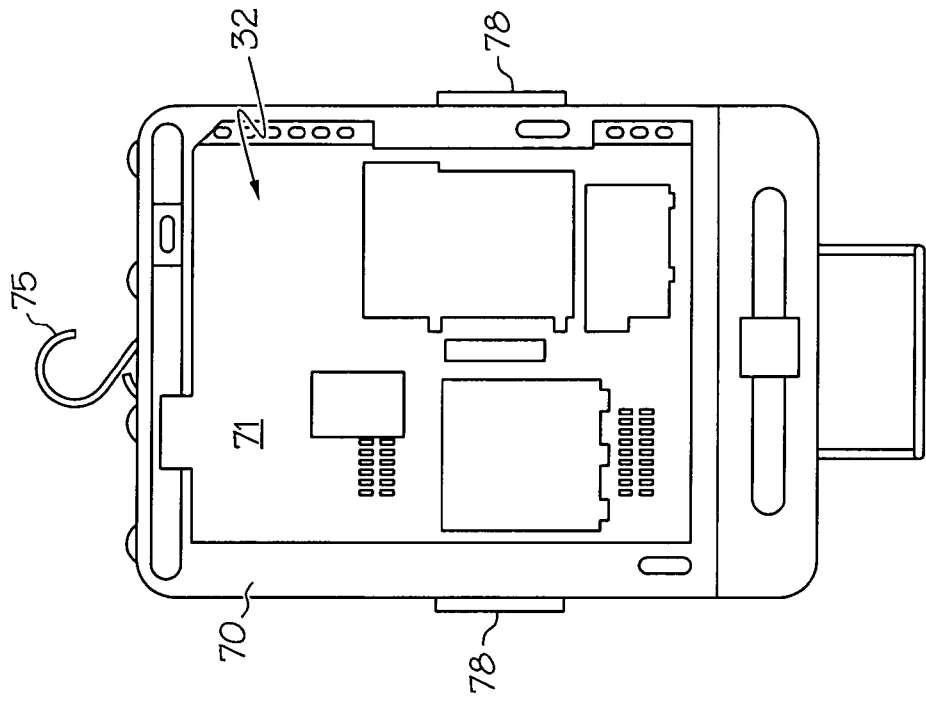
FIG. 4 is a front view of a display unit having a case and docking structure in accordance with the present invention.

FIG. 4 illustrates a front plan view of one embodiment of a display unit 32, retained within docking structure 40, with case 70 covering portions of display unit 32. In one embodiment of the present invention, case 70 is constructed from a protective material such as, for example, cushioning material or elastic material, and substantially encases display unit 32. Case 70 may include padding or other protective material positioned around the perimeter of display unit 32 to protect the detachable display unit 32, such as, from accidental falls or daily wear and tear on the instrument. In one embodiment, case 70 may include transparent portion 71, affixed to the perimeter padded protective material, covering the visual display portion of display unit 32. Transparent portion 71 may be constructed from any suitable transparent or semi-transparent material and may reduce the contamination of the control assembly 16 associated with frequent interaction with display unit 32. In a further embodiment of the present invention, transparent portion 71 may be a touch pad overlay having writing and/or symbols indicating the significance of associated touch pad keys lying underneath (not shown).

Referring to FIGS. 4, 5, 6, and 7, in one embodiment of the present invention, case 70 comprises an attachment coupling 75. Attachment coupling 75 may be any suitable attachment device suitable for allowing display unit 32 to be hung from, for example, the lift such as column 2, part of a vehicle, or any other suitable location. Attachment coupling 75 may be, in one embodiment, a semi-circular hook that is sewed into case 70. Case 70 may also be provided with concealer 76. Concealer 76 may be, for example, a flap affixed to case 70 at one end and detachably coupled to case 70, such as by a VELCRO connection, at the opposite end. Concealer 76 may substantially conceal attachment coupling 75 when attachment coupling 75 is not in use, to prevent case 70 from catching on other instruments.

Figure 5:
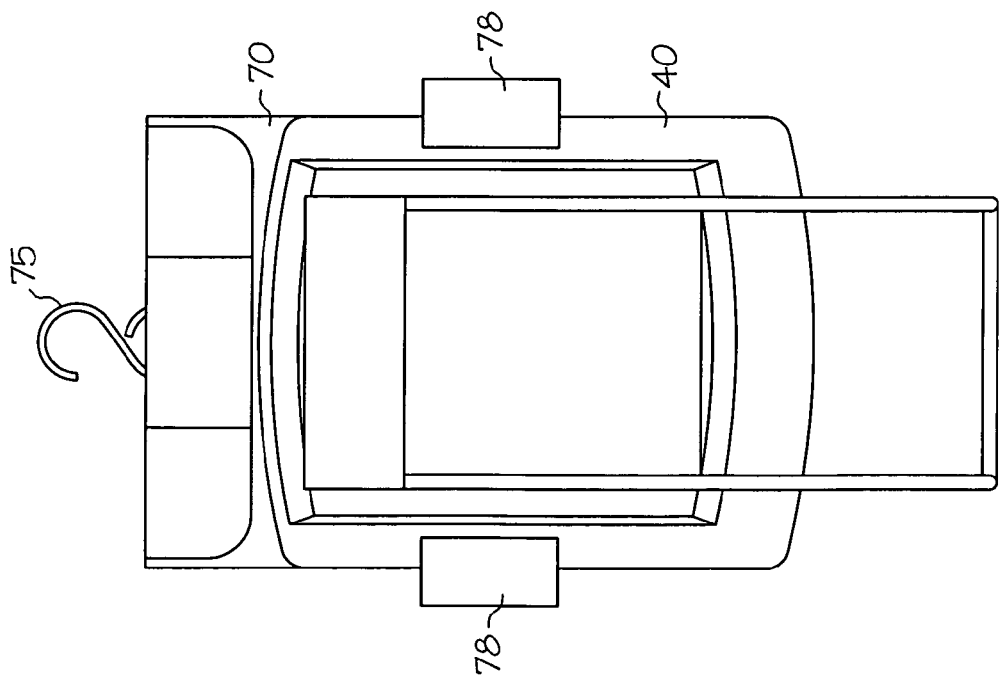
FIG. 5 is a rear view of the display unit of FIG. 4.
Figure 6A:
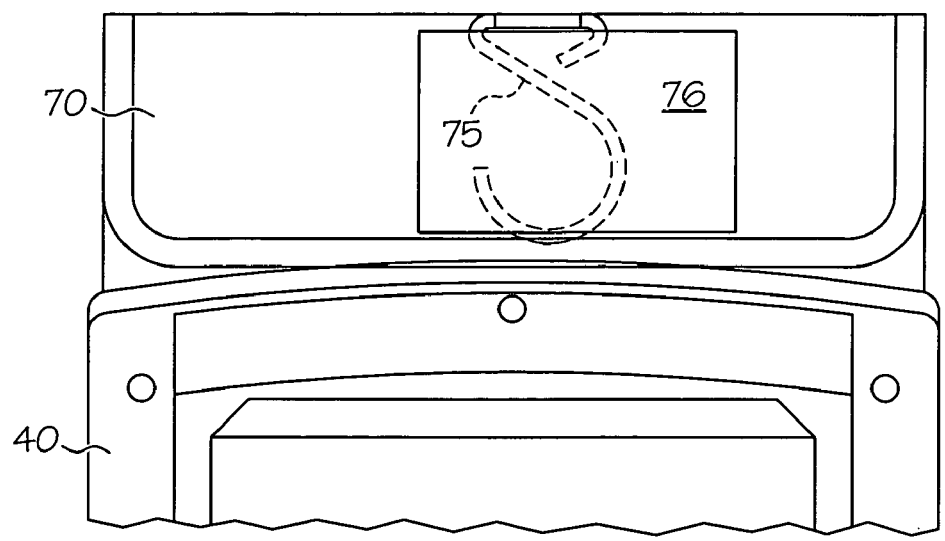
FIG. 6a is a partial rear view of a display unit having a case illustrating an attachment coupling in a concealed position in accordance with the present invention.
Figure 6B:
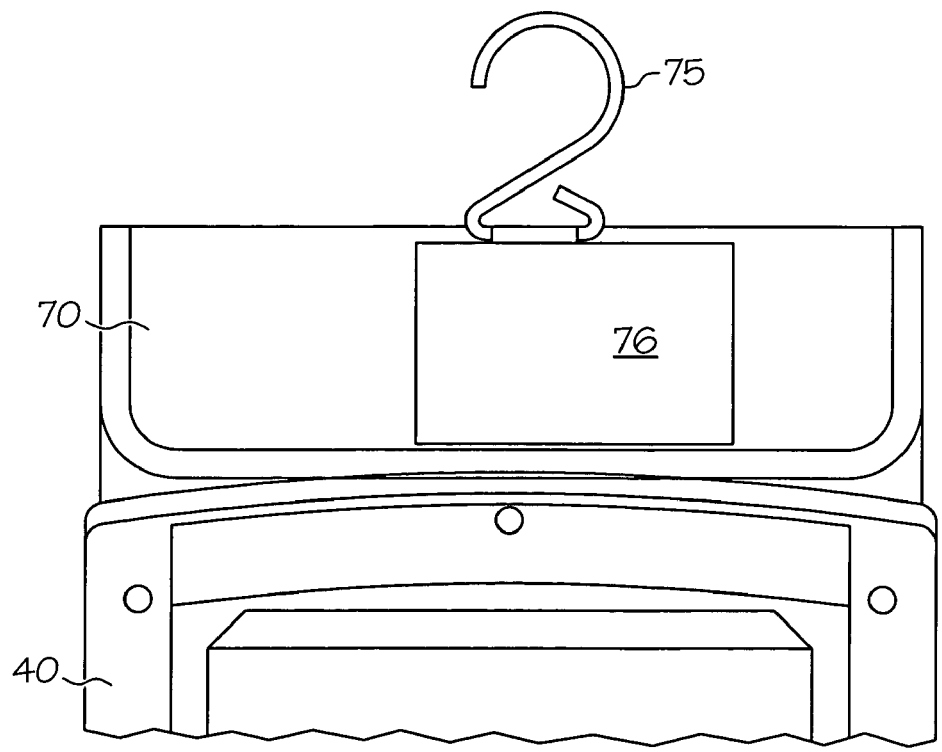
FIG. 6b is a partial rear view of a display unit having a case illustrating an attachment coupling in an open position in accordance with the present invention.

In a further embodiment of the present invention, referring to FIGS. 4 and 5, display unit 32 may be provided with a wireless connection, such that display unit 32 may display and update lift data when not interfaced with docking structure 40. Removal of case 70 and display unit 32 from docking structure 40 may engage, for example, a DC power source housed within display unit 32. After removal from docking structure, display unit 32 may, in one embodiment of the present invention, be placed, via attachment coupling 75, to any suitable location desirable for viewing lift data. When reattached to docking structure 40, attachment coupling 75 may be concealed.

Figure 7A:
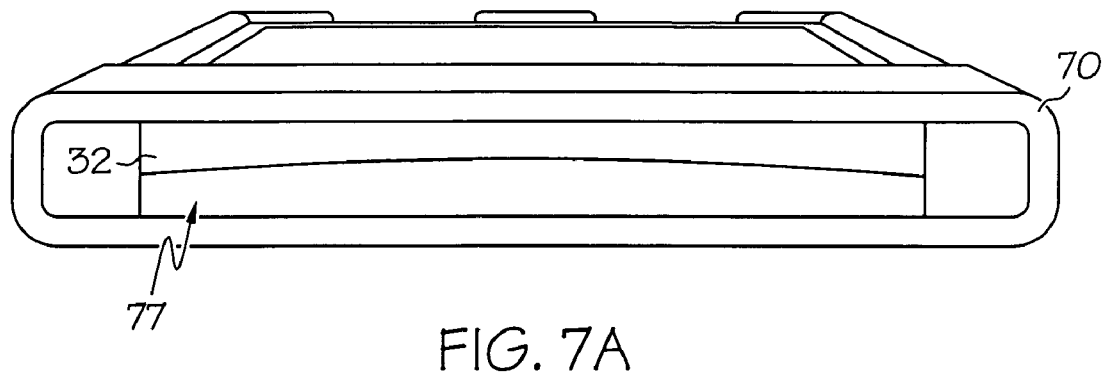
FIG. 7a is a side perspective view of the display unit of FIG. 4.
Figure 7B:
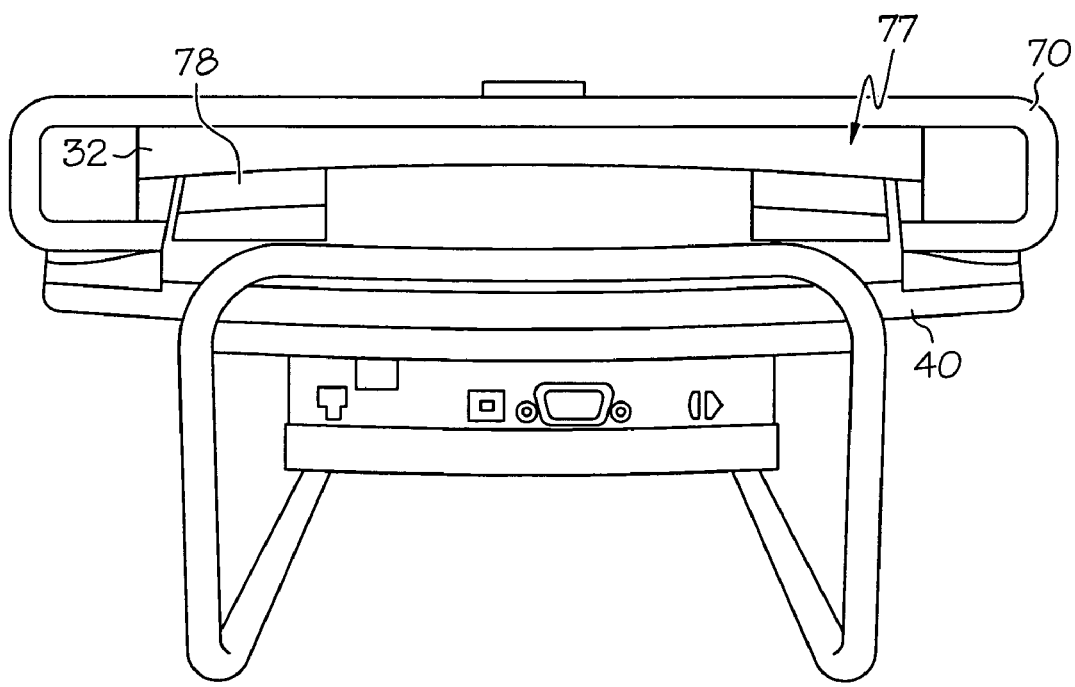
FIG. 7b is a side perspective view of the display unit of FIG. 4.

Referring to FIGS. 7a and 7b, case 70, in one embodiment of the present invention, may include cutouts 77 in the protective material. Cutouts 77 may be provided with any suitable shape or configuration to engage arms 78 of docking structure 40. When pushed over arms 78, the raised perimeter of case 70 surrounding cutouts 77 may retain case 70 within locking structure 40. In one embodiment of the present invention, to remove display unit 32, case 70 may be manually pulled away from docking structure 40, thereby disengaging cutouts 77 from arms 78.

Figure 9:
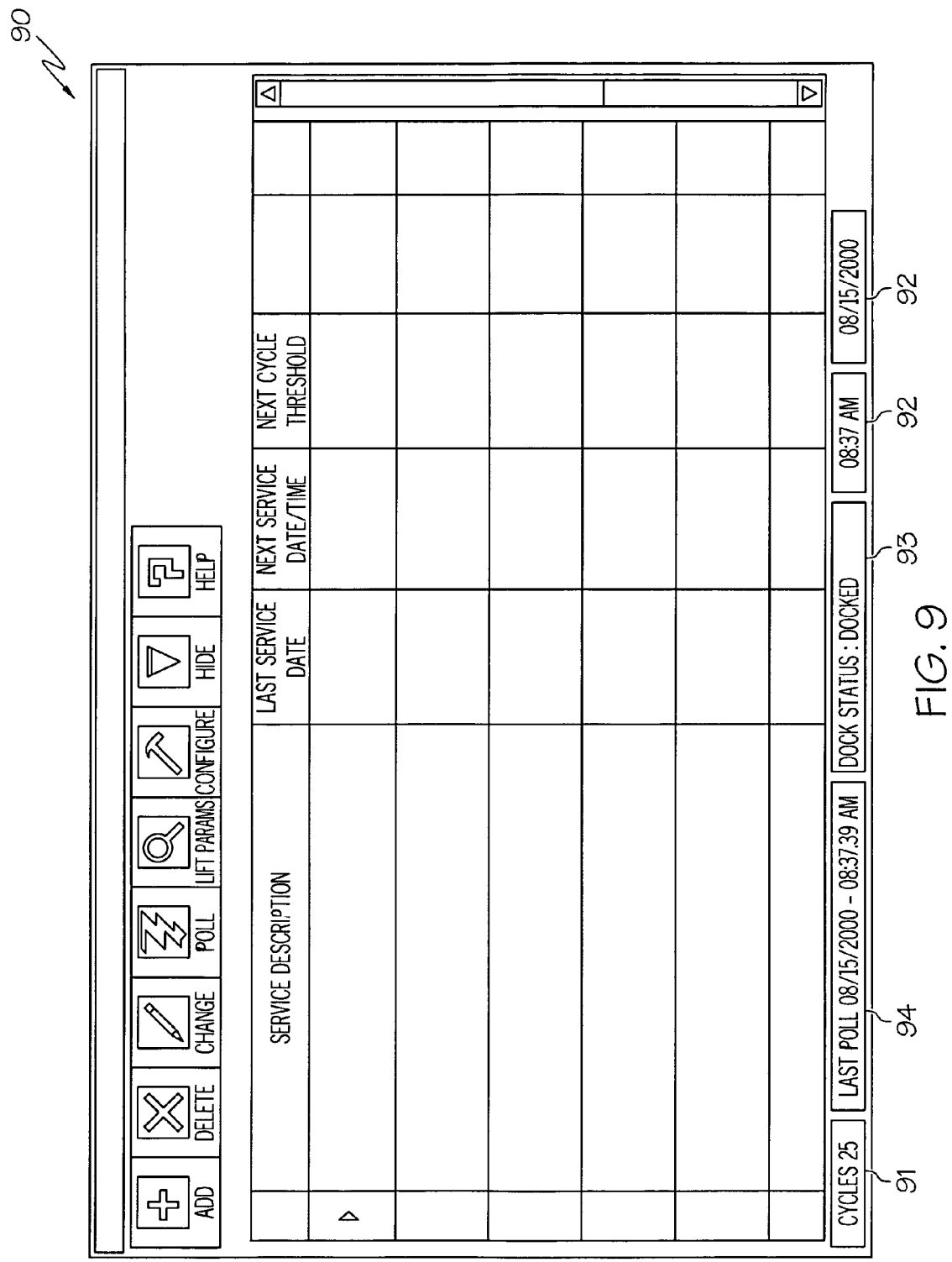
FIG. 9 illustrates a visual display for the display unit of FIG. 4.

FIG. 9 illustrates one embodiment of a visual display 90 that may be shown on display unit 32 in accordance with a lift information system. The lift information system may include a first function monitoring the status of the lift computer, lift electrical system, lift mechanical system, lift electromechanical system, lift hydraulic system, and/or other systems, a second function providing a user with a preventative maintenance and/or reminder system, and a third function for control of lift movement. Visual display 90 may include programming associated with an operating system such as, for example, Microsoft Windows, that may display any suitable lift data to a user. Visual display 90 may include lift cycle indicator 91 that displays the number of times the lift has been utilized (e.g. current number of lift cycles). Visual display 90 may include current time and/or date indicator 92 which may display calendar information to a user at all times or upon request. Visual display 90 may be provided with dock status display 93, where sensors associated with the lift may relay dock status (e.g. docked or undocked) to the processor for display on display unit 32. In a further embodiment of the present invention, visual display 90 may display indicator 94 of the last time and/or date the lift was used or the date/time the lift computer was last polled.

In one embodiment of a lift information system, the information system has two functions. The first is to monitor the status of the lift computer and the second is to provide the technician a preventive maintenance and reminder system. The information system will launch automatically when the computer is started and remains running in the background constantly monitoring the lift and checking for preventative maintenance activities and reminders. In this embodiment, Rotary Lift has preloaded the prescribed maintenance activities for the lift. The maintenance intervals are either based on time or on lift usage. The more the lift is used, the more often it needs to be maintained. To find the information system application, a user may have to locate the application in the Windows Taskbar. In this embodiment, the Taskbar is located at the bottom of the screen. The user can locate the information system application in the Taskbar and click once on the button to maximize the application. The Windows form will appear similar to the graphic depicted in FIG. 9. This application utilizes a grid 95 format to give the technician a snapshot of all preventative maintenance or reminder activities in the system. The technician can quickly see what activities are coming up by referring to the "Service Description," "Next Service Date/Time" and the "Next Cycle Threshold" columns.

Still referring to FIG. 9, visual display 90 may, in one embodiment, include grid 95 depicting, for example, past usage of the lift, duration of previous usages, previous lift cycles, a description of the service performed, and billing information. Future events may also be depicted in grid 95 such as, for example, the next service date and/or time recommended and the next cycle threshold.

Figure 10:
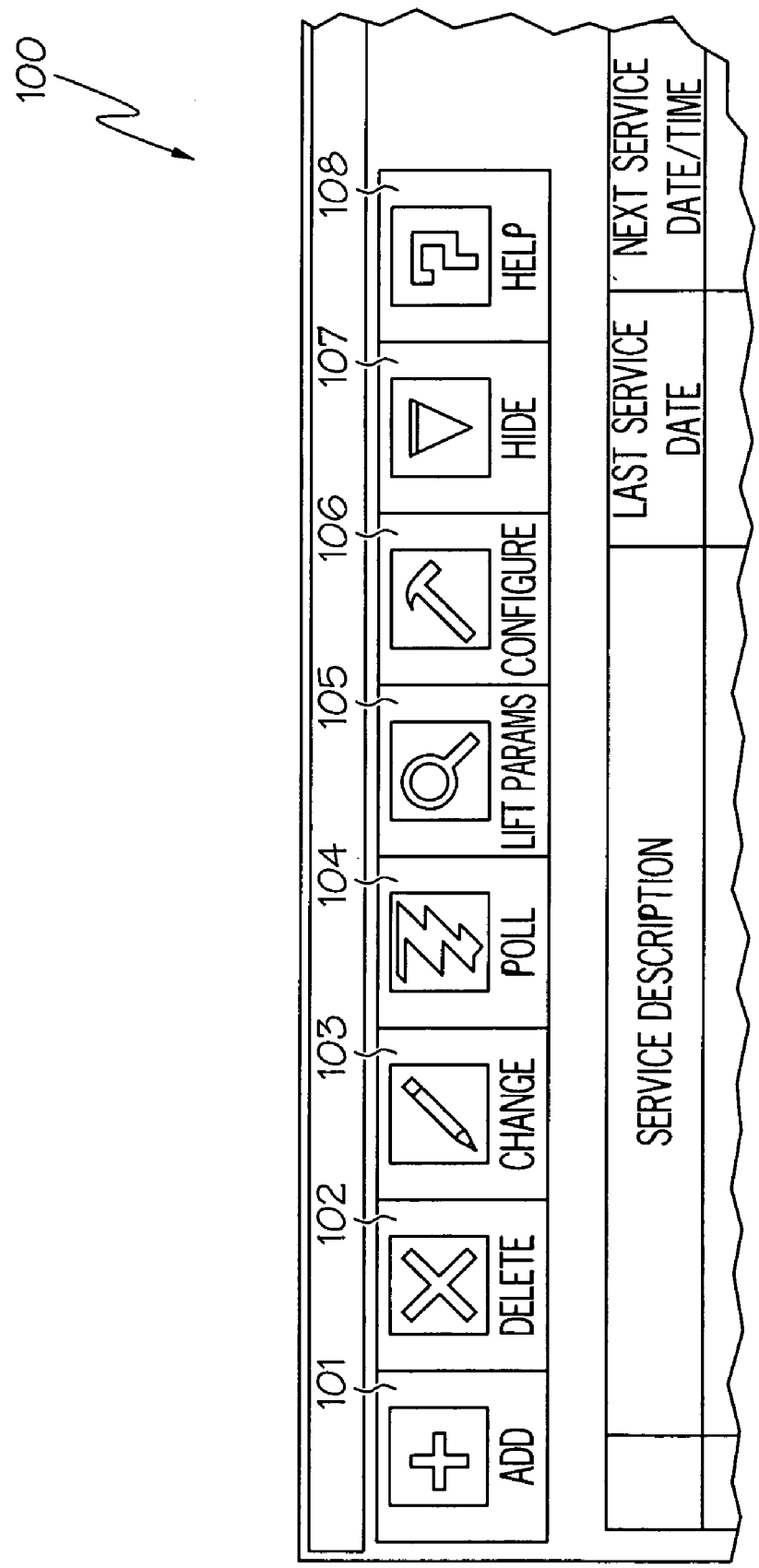
FIG. 10 illustrates an action toolbar for the visual display of FIG. 9.

FIG. 10 illustrates one embodiment of action toolbar 100 that may be shown in accordance with visual display 90. Action toolbar 100 may be provided upon user request or may be presented to a user at all times during system use. Action toolbar 100 may be, for example, a series of iconic buttons that may be pressed by touch screen or are otherwise activated by mouse or keypad. Action toolbar 100 may include add a new reminder command 101, delete a reminder command 102, change a reminder command 103, manually poll the lift computer command 104, view the lift parameters command 105 (e.g. may be used for diagnostic purposes), make configuration changes command 106 (usually performed by the administrator), hide or minimize the information system application command 107, and/or help command 108. Action toolbar 100 may also include any suitable command icon suitable for performing diagnostic inspection of the lift and/or the processor of control assembly 16. In one embodiment, toolbar 100 enables a user to quickly locate and access the functionality of a lift information system application.

Figure 11:
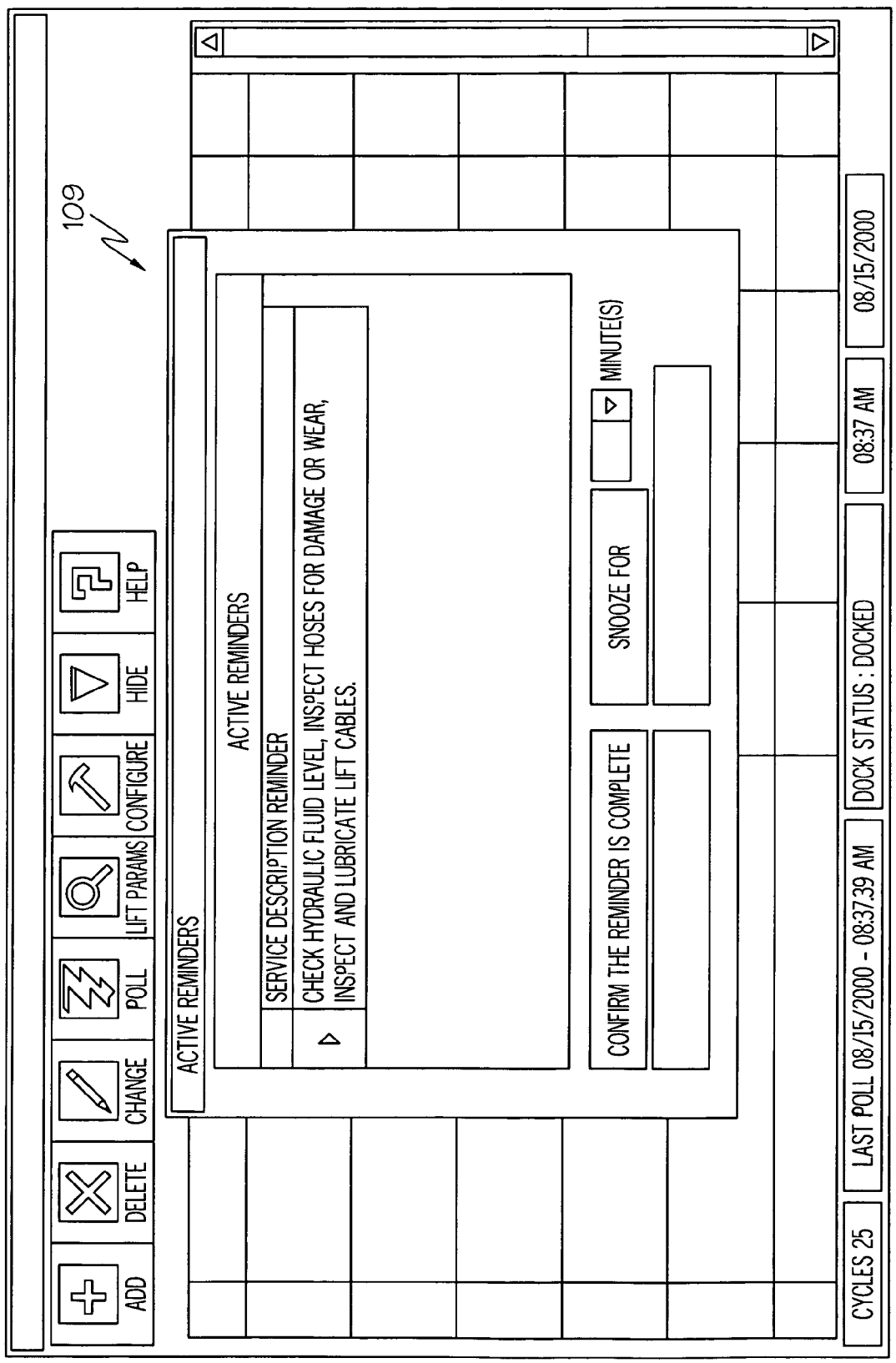
FIG. 11 illustrates a pop-up for the visual display of FIG. 9.

FIG. 11 illustrates one embodiment of pop-up 109, which may appear on visual display 90. The lift information system may, for example, comprise programming, cooperating with programmed calendar 110 (FIG. 12), that commands pop-up 109 when a routine operation is to be performed on a lift. For example, a technician from a maintenance provider may need to inspect a lift every six months, where a week prior to the inspection date a pop-up 109 may alert the user that an inspection is due, that an inspector is coming, and/or ask for confirmation that an inspection is requested. Lift data related to pop-ups 109 may, for example, be stored in the processor, for example such as in display unit 32, or sent to a remote central processor networked to multiple lifts. Lift data may, in one embodiment, be updated either continuously or periodically. A further embodiment of the present invention comprises providing users with the ability to create their own pop-ups as reminders for, for example, maintenance, security, diagnostic testing, or billing, and may be based upon programmed calendar 110 or other suitable parameters. For example, a pop-up may also be pre-programmed to occur when the lift has exceeded an established threshold of use cycles. Upon exceeding this threshold the user may be instructed to contact a representative or may be informed that a representative has been dispatched. In one embodiment of the present invention, pop-up 109 may also include a snooze feature, where pop-up 109 may be temporarily removed for a set period of time before recurring.

In one embodiment, when the number of lift cycles equals the cycle threshold for a particular activity, a pop-up 109 reminder will be displayed. The technician has two options when the reminder is displayed: "Snooze" the reminder for a number of minutes; or complete the activity and confirm the reminder is complete. To "Snooze" the reminder, the user may use the dropdown box to select the number of minutes to snooze. The user can also type in the number of minutes in the text box. When finished, the user may click once on the "Snooze for" button.

Figure 12:
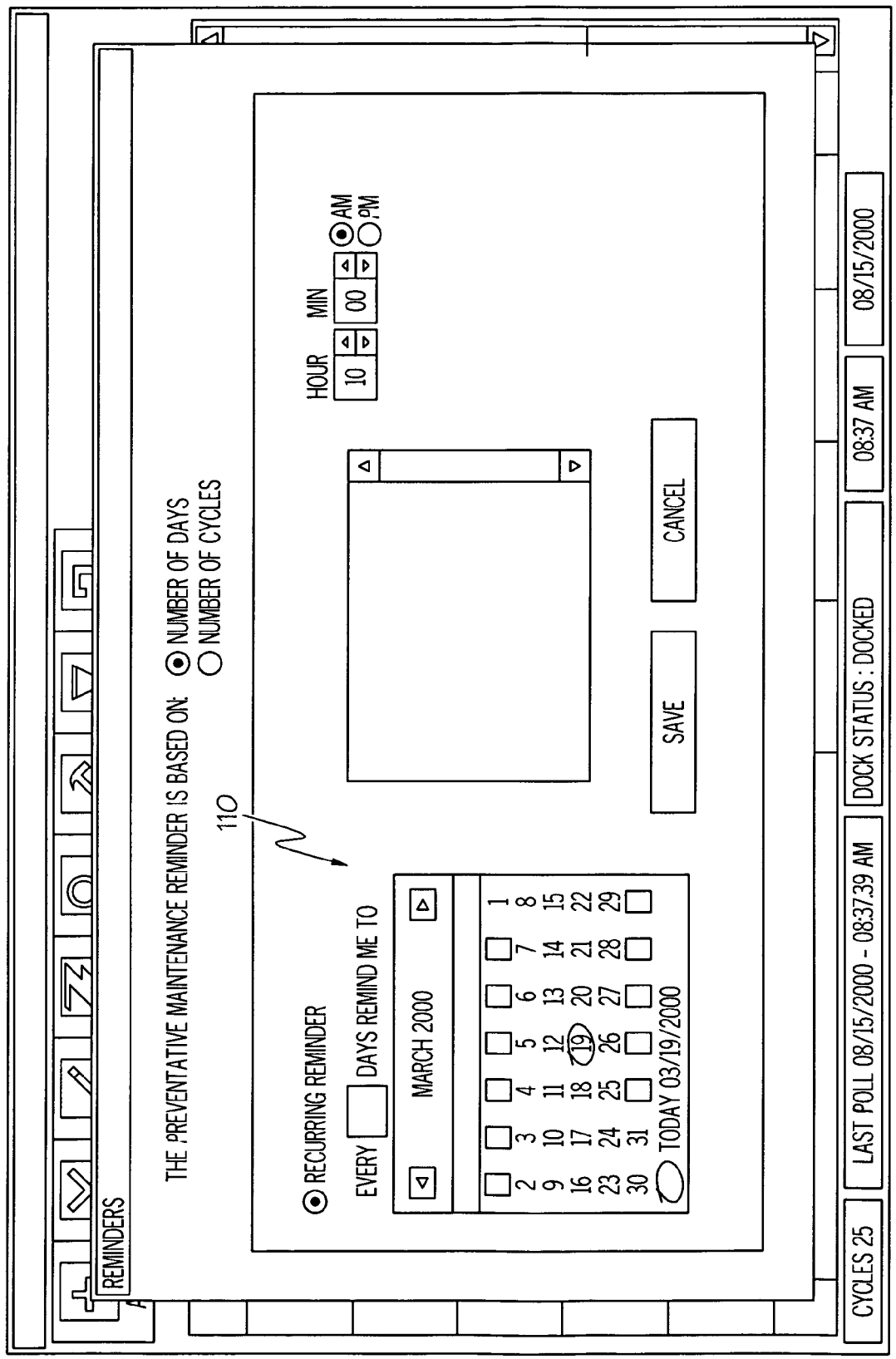
FIG. 12 illustrates a programmed calendar for the visual display of FIG. 9.

In another embodiment, with reference to FIG. 12, the user can create a new reminder based on either days or lift cycles. To add a new reminder, the user may click once on the "Add" button (i.e., the add a new reminder command 101) in the toolbar 100. To select days or lift cycles, the user may click once on the appropriate radio button. The next step is to determine if this reminder needs to be recurring or a one time event. The user may type in the number of days between events or select a date from the calendar and the number of days will be automatically entered. The final steps are to enter a description of the preventative maintenance or reminder and select a time to display the event. When finished, the user may click once on the "Save" button.

Figure 13:
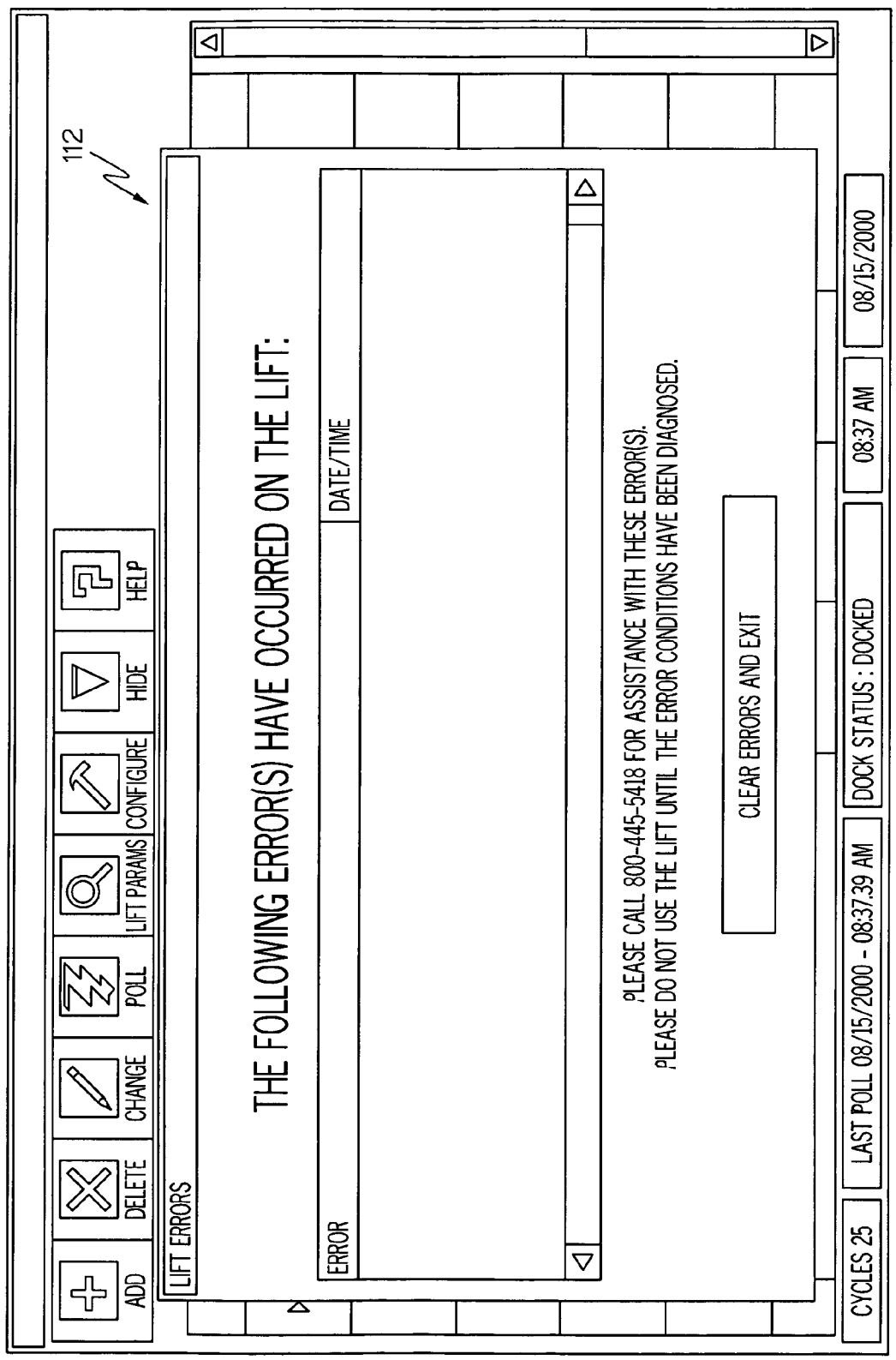
FIG. 13 illustrates an error display for the visual display of FIG. 9.

FIG. 13 illustrates one embodiment of error display 112 that may be shown on visual display 90. Error display 112 may be pre-programmed to register and display a brief summary of any lift, network, and/or processor malfunction that occurs. Error display 112 may be displayed upon the occurrence of a system error, where error display 112 may contain an "okay" button confirming that the user has recognized the error. One embodiment of the present invention further comprises signaling the processor to send the error message to a remote location such as, for example, a customer service provider, where error messages may be evaluated and service decisions may be made.

In one embodiment, where display unit 32 comprises a tablet, whenever certain problems occur with the lift or the lift's embedded computer, a message will be displayed on the tablet's screen if the tablet computer is docked in the lift's docking station. If a problem occurs when the tablet computer is undocked, the message will be displayed when the tablet computer is re-docked. When an error occurs, the cause of the problem should be assessed. For example, a photo sensor fault error indicates the vehicle has been raised too high and has tripped the overhead sensor.

In another embodiment, the user may change a preventative maintenance activity. To change a reminder activity in this embodiment, the user may select the activity by clicking once in the grey column to the left of the service description. The user may then click once on the "Change" button (i.e., the change a reminder command 103) in the toolbar 100. In this embodiment, if the user selects a pre-existing "factory" preventative maintenance activity, the number of cycles or days can only be decreased. Using the scroll buttons, the user may adjust the number of cycles or days to the desired value and click the "Save" button. Selecting to change a personal reminder will display a screen. Any reminder options can be changed when updating a personal reminder. The user may make any necessary modifications to the reminder (refer to text discussing FIG. 12) and then click once on the "Save" button.

Although not shown, the present invention comprises providing a security system programmed into the processor and/or control assembly 16. The security system may send data directly to the visual display 90 for display to the user and/or data may be transmitted to a remote location, such as a customer service provider, for evaluation, archiving, or other purposes. One embodiment comprises providing sensors to monitor any lift condition that may be hazardous if not carefully monitored. For example, sensors on the lift may detect the number of lift cycles the lift has performed and may send this data to the processor. The processor may be pre-programmed with a set threshold indicating the safe number of lift cycles that may be performed before maintenance is suggested and/or required. When the threshold is exceeded, the system may, using source code for example, indicate to the user that a security condition exists. In one embodiment, the system may also contact a remote location, such as a corporate headquarters, with the security report and/or disable the lift until proper procedures have been undertaken. In a further embodiment of the present invention, the lift will not be disabled, but a persistent security indicator will warn the user of the condition until the situation is alleviated.

In one embodiment of the present invention, a security system may require an identity indicator before permitting the lift to become operable. Proper access may be protected by any suitable access protection means such as, for example, password protection, key access, card-swipe access, voice activation, or other biometrics based activation. Control assembly 16 may also include a log that, for example, registers the identity of each user who operates the lift, the activities performed by the user on the lift, the duration of the user, and/or any errors that occurred during the use of the lift. The log, in one embodiment of the invention, may be accessed by a manager and/or security administrator to insure that the lift is used in accordance with established procedures.

Although not shown, the present invention comprises the integration of one or a plurality of lift sensors integrated with the processor. Sensors may be positioned at any suitable location, such as in, on, and/or near the lift, by way of example only. In one embodiment, sensors are configured to communicate data relating to the lift, such as data relating to use and/or condition of the lift. Sensors may be adapted to monitor lift characteristics related to, for example, providing adequate safety, insuring proper lift use, insuring proper billing, insuring proper maintenance, and/or insuring proper lift loads.

To insure proper billing, in one embodiment, the system may record all lift cycles and compare the lift cycle data with user financial data to insure that use and billing are commensurate. One embodiment of the present invention includes, for example, incorporating financial programs, such as QUICKEN, into the processor, where financial records may be compared and/or stored in conjunction with lift data.

The system may also interface with centralized billing or financial software of the establishment.

In one embodiment of the present invention the processor of control assembly 16 includes two modes of data transmission. Pre-programming of the processor may send data recorded from lift sensors to pre-set locations based upon the classification of the data. In one embodiment of the present invention, sensor data may be classified as maintenance, security, use, and/or personal.

Sensor data may be pre-programmed or programmed by the user to be sent by, for example, the processor to desirable locations, selected depending on the characteristics of the information. For example, a load sensor on the lift may transmit data to the processor, where the processor evaluates whether the sensor has indicated a load above the established safety threshold. Once exceeded, pre-programming of the processor may be established that displays this warning only to the user. The transmission of local warnings may provide added security to local lift operators without signaling a fault to a remote location such as, for example, a corporate headquarters.

Data and/or warnings detected by the processor from use sensors, which may ascertain the number of times the lift has cycled, may be transmitted by the pre-programmed processor to a local user and/or to a remote location such as, for example, a customer service provider. Sending data to multiple locations may, for example, help insure that a heavily used lift is not operated until maintenance is provided, by dispatching or alerting a customer representative to contact or visit the user. Simultaneously, in one embodiment, a message may be sent, to a remote location, such as a customer service provider or maintenance facility, indicating that the facility operating the lift should be contacted regarding a routine check-up or repairs. One embodiment of the present invention comprises providing multiple sensors that communicate data to a processor of control assembly 16, where the processor is preprogrammed to categorize the sensor data and communicate warnings, indicators, or notices, through display or other suitable communication means, to a service provider, a user, a corporate headquarters, and/or other lifts. In one embodiment of the present invention, data is monitored at each sensor every sixty-seconds. In addition, or in the alternative, data may be communicated from lift system to a network location periodically, such as once every sixty-seconds, or at any other desirable time interval. Sensor data may, for example, be sent by the processor in a real-time or near real-time stream of data over a network, or only at pre-determined intervals. Alternatively, sensor data may be communicated to a network location only when a local processor or results of evaluation have determined that one or more conditions have been satisfied. Alternatively, sensor data may be communicated upon remote request.

In one embodiment of the present invention, control assembly 16 may be integrated with a local and/or global communications network. Data may be received, for example, by the processor of control assembly 16, from one or a plurality of sensors. The processor may acquire data from the sensors by any suitable communications or transmission means known in the art. Sensor data may then be communicated to network locations by the processor, where the network locations may store, evaluate, and/or display the transmitted data. For example, a plurality of lifts may be integrated into a national network over the internet. Data from lift sensors detecting a fault may be transmitted by the processor to a network location that categorizes all of the lift faults from all lift locations. A remote processor may then evaluate all fault data to ascertain whether specific system and/or user faults are occurring at unacceptably high levels. Alternatively, the processor of control assembly 16 may evaluate lift data and send fault data to a remote location for processing. Collected data may be communicated to network locations in any suitable fashion, as will be appreciated by those of ordinary skill in the art. By way of example only, data may be pushed from the sensors, pulled from the sensors, or both.

The compiled data may then, for example, be used to transmit updated warning information, notices, and/or recall information to all lift users to indicate potential problems and suggested preventative maintenance. One embodiment of the present invention comprises providing individual lifts with specific identifications, such as serial numbers, that correspond to lift location, lift ownership, and/or any other suitable parameter stored at a network location. Monitoring lift faults may, for example, help target specific users and/or locations that may be experiencing greater than usual errors in use of the lifts. Excessive faults from a single location may signal a network administrator and/or service provider to provide an additional maintenance check or additional training on use of the system. In addition to fault and/or warning notices, a remote network location, such as a corporate headquarters, may communicate any suitable notice to lift operators including, for example, advertising notices.

In addition, other possible uses of functions of, means of gathering, and means of communicating lift data will be apparent to those of ordinary skill in the art. It will also be appreciated by those of ordinary skill in the art that the monitoring, diagnostic, and/or communications systems disclosed herein may be integrated, in whole or in part, with one or more controls systems and/or other systems. Alternatively, one or more of such systems may be separate from the other systems relating to the lift. By way of example only, one or more systems having features of the monitoring, diagnostic, and/or communications systems disclosed herein may be installed on a lift that has a pre-existing control system. Still other possible system or systems configurations will be apparent to those of ordinary skill in the art. Further, it is noted that in an alternate embodiment, the display unit 32 may be a laptop or tablet computer which does not interface with the lift functions or monitoring of the lift conditions, functioning stand alone while mounted to the lift.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of monitoring a vehicle lift, the method comprising:
   (a) providing a vehicle lift system, wherein the vehicle lift system comprises:
      (i) a vehicle lift, wherein the vehicle lift is operable to raise and lower a vehicle,
      (ii) one or more sensors, wherein at least one of the one or more sensors is positioned on or in the vehicle lift, wherein the one or more sensors are operable to collect lift data, wherein the lift data indicates one or both of lift use characteristics or lift performance,
      (iii) a processing circuit in communication with the one or more sensors, wherein the processing circuit is operable to detect a maintenance condition of the vehicle lift based at least in part on the lift data, and
      (iv) a communication circuit in communication with the processing circuit, wherein the communication circuit is operable to communicate one or both of the lift data or data indicating a maintenance condition of the vehicle lift; and
   (b) monitoring the vehicle lift, wherein the act of monitoring the vehicle lift comprises receiving a communication from the communication circuit.

2. The method of claim 1, wherein the communication circuit is operable to communicate wirelessly.

3. The method of claim 1, wherein the vehicle lift is positioned at a first location, wherein at least a portion of the act of monitoring the vehicle lift is performed at a second location remote from the first location.

4. The method of claim 3, further comprising receiving a communication from the communication circuit at the second location.

5. The method of claim 1, the method further comprising storing lift data collected by at least one of the one or more sensors.

6. The method of claim 5, wherein the vehicle lift is positioned at a first location, wherein the act of storing lift data is performed using a storage medium positioned at a second location remote from the first location.

7. The method of claim 1, wherein the one or more sensors are in communication with the processing circuit via the communication circuit.

8. The method of claim 7, wherein the vehicle lift is positioned at a first location, wherein the processing circuit is positioned at a second location remote from the first location.

9. The method of claim 1, further comprising:
   (a) detecting a maintenance condition of the vehicle lift, wherein the maintenance condition of the vehicle lift is detected by the processing circuit; and
   (b) receiving a communication from the processing circuit indicating the maintenance condition detected by the processing circuit.

10. The method of claim 9, wherein the vehicle lift is positioned at a first location, wherein the communication from the processing circuit indicating the maintenance condition is received at a second location remote from the first location.

11. The method of claim 10, wherein the communication from the processing circuit is received at the second location via the communication circuit.

12. The method of claim 9, wherein the communication circuit is configured to communicate the maintenance condition of the vehicle lift in response to the act of detecting the maintenance condition of the vehicle lift.

13. The method of claim 9, further comprising preventing use of the vehicle lift in response to the indication of the maintenance condition of the vehicle lift.

14. The method of claim 13, wherein the vehicle lift is positioned at a first location, wherein the act of preventing use of the vehicle lift comprises issuing a command to prevent use of the vehicle lift, wherein the command is configured to prevent the vehicle lift from raising and lowering vehicles, wherein the act of issuing a command to prevent use of the vehicle lift is performed from a second location remote from the first location.

15. The method of claim 9, wherein the vehicle lift is positioned at a first location, the method further comprising dispatching maintenance personnel to the first location in response to the indication of the maintenance condition of the vehicle lift.

16. The method of claim 1, further comprising displaying at least a portion of the lift data collected by the one or more sensors.

17. The method of claim 16, wherein the vehicle lift is positioned at a first location, wherein the act of displaying is performed at a second location remote from the first location.

18. The method of claim 1, wherein the vehicle lift is positioned at a first location, the method further comprising communicating one or both of data or commands to the vehicle lift from a second location remote from the first location.

19. A vehicle lift system, the vehicle lift system comprising:
   (a) a vehicle lift operable to raise and lower a vehicle, wherein the vehicle lift is positioned at a first geographical location;
   (b) one or more sensors, wherein at least one of the one or more sensors is positioned on or in the vehicle lift, wherein the one or more sensors are operable to collect lift data, wherein the lift data indicates one or both of lift use characteristics or lift performance;
   (c) a processing circuit in communication with the one or more sensors, wherein the processing circuit is operable to detect a maintenance condition of the vehicle lift based at least in part on the lift data; and
   (d) a communication circuit in communication with the processing circuit, wherein the communication circuit is operable to communicate one or both of the lift data or data indicating a maintenance condition of the vehicle lift to a second geographical location remote from the first geographical location.

20. A vehicle lift system, the vehicle lift system comprising:
   (a) a vehicle lift station, wherein the vehicle lift station is located at a first geographical location, wherein the vehicle lift station comprises:
      (i) a vehicle lift operable to raise and lower a vehicle,
      (ii) a vehicle lift monitoring system operable to collect and communicate lift data representing one or both of lift use characteristics or lift performance, wherein the vehicle lift monitoring system comprises a plurality of sensors positioned on or in the vehicle lift and a first communication module operable to transmit lift data; and
   (b) a vehicle lift monitoring station, wherein the vehicle lift monitoring station is located at a second geographical location remote from the first geographical location, wherein the vehicle lift monitoring station comprises a second communication module operable to receive transmissions from the first communication module.

* * * * *